Sept. 6, 1927.
B. C. STICKNEY
1,641,787
INTERNAL COMBUSTION ENGINE
Filed Feb. 21, 1924
5 Sheets-Sheet 1
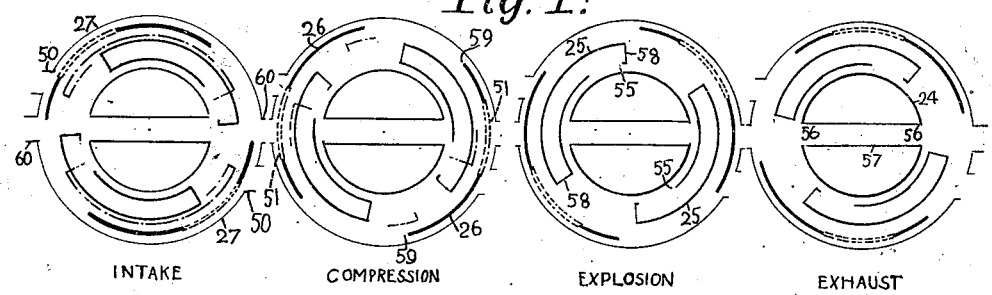
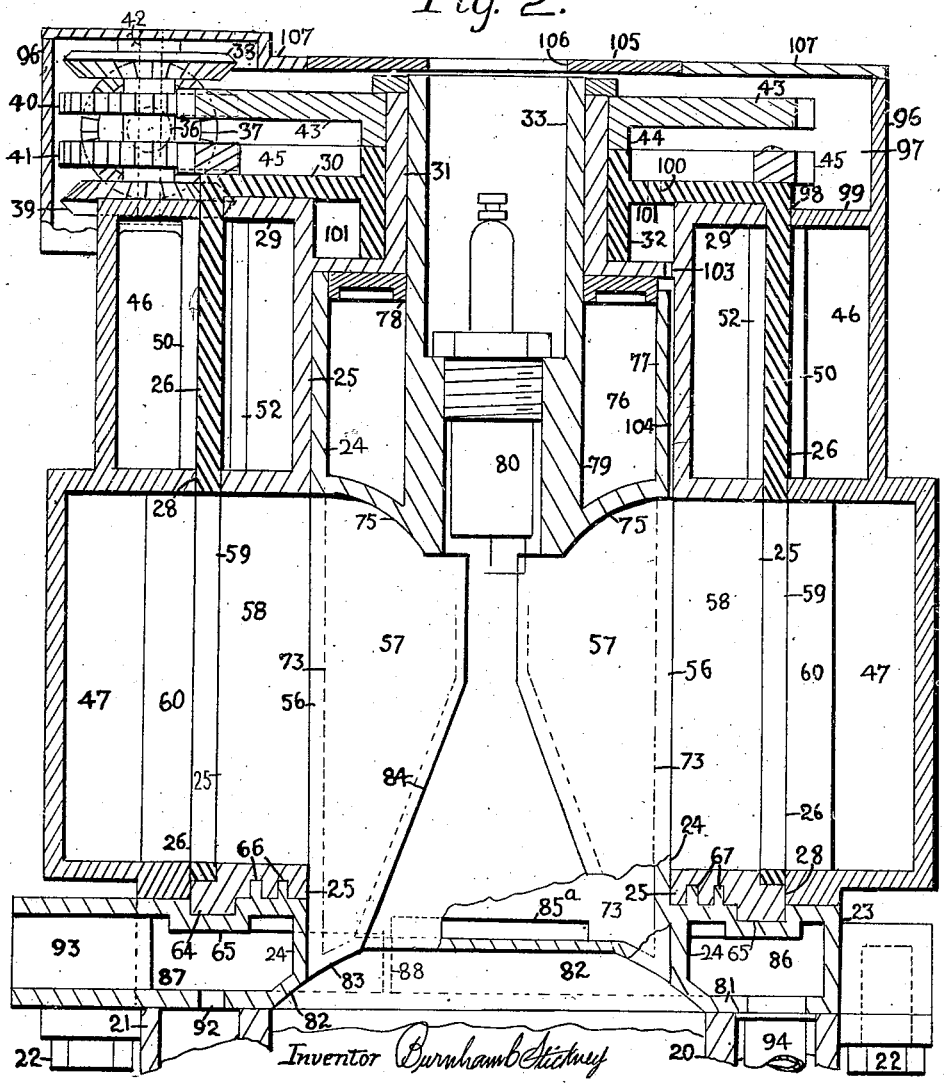

Inventor
Burnham C Stickney

Sept. 6, 1927.  B. C. STICKNEY  1,641,787
INTERNAL COMBUSTION ENGINE
Filed Feb. 21, 1924   5 Sheets-Sheet 4

Inventor
Burnham C Stickney

Sept. 6, 1927. 1,641,787
B. C. STICKNEY
INTERNAL COMBUSTION ENGINE
Filed Feb. 21, 1924 5 Sheets-Sheet 5

Inventor
Burnham C Stickney

Patented Sept. 6, 1927.

1,641,787

UNITED STATES PATENT OFFICE.

BURNHAM C. STICKNEY, OF RUTHERFORD, NEW JERSEY.

INTERNAL-COMBUSTION ENGINE.

Application filed February 21, 1924. Serial No. 694,208.

This invention relates to rotary valves for internal combustion and other engines, and mainly to valves which comprise telescoped differentially-revolving ported shells.

The inner of the valve shells is fitted over an internal valve seat in the form of a dome, which is provided with a water passage that extends up on one side and across the top of the dome and down on the other side. The valve seat ports are opposed, for securing balance of pressure upon the inner valve shell; the latter making one revolution for preferably four revolutions of the crankshaft of the engine. The outer of the revolving shells fits within a ported chest, and the latter is preferably integral with both intake and exhaust manifolds which extend in pairs along the sides of the row of valve chests.

The valve chests rise from a base, which constitutes a detachable head for the row of engine cylinders; the latter preferably having direct water communication with said engine head, which is also in water-communication with the above-mentioned water passages in the internal valve seat. The latter contains the spark plug, which is accessible from the top.

The outer valve shell has exhaust ports in its lower portion and inlet ports in its upper portion, to communicate with the respective manifolds. The inner valve shell has exhaust and inlet ports, to co-operate with the outer shell and the internal valve seat.

One of the important features of the invention is that one of the valve shells, preferably the inner, is hollow-walled, and the diameter of its exterior periphery greatly exceeds that of its inner periphery. At its large outer periphery it co-operates with the outer valve shell to secure quick opening and closing of gas passages, while because of its small inner periphery the diameter of the internal valve seat is minimized, reducing the surface friction of the inner valve shell thereon, and permitting a closer fitting of the inner valve shell upon said dome to minimize leakage, and minimizing the use of oil, and permitting a reduction of capacity of the explosion chamber with its gas passages, while the latter have ample transverse area. Another advantage gained by the hollow-walled valve shell, which may be a single iron casting, is that great strength is secured in proportion to the weight of the shell, so as to withstand the shock of explosion.

To gain another advantage, the hollow wall of the valve is used as a reservoir and conduit for the fuel mixture from the intake manifolds, which may circulate through said hollow wall, and become heated thereby, as well as more thoroughly mixed and better prepared for combustion. At the same time the fluid serves as a substantial cooling agent for the valve shell itself. Hence the latter, being also partly cooled by the water in the internal valve seat, will remain of substantially the same temperature as said seat, and hence may be closely fitted thereto and practically form a seal against escape of gas at the compression and explosion strokes.

To secure a further advantage, the fuel mixture from the manifold enters at the top portion of said hollow wall (through ports which are above the exhaust manifold), and is then conducted around and down through the circular chamber to an inlet port which is at the same level as the exhaust port in said valve shell. One of the advantages of having the walls of the inner valve shell well separated, is that ample space may be left between them for the flow of gas. Thus the circular gas chambers in said shell are ported at the top to communicate with the intake manifolds, and ported at the bottom to open into the internal valve seat and hence into the explosion chamber of the engine. Thus the seat has only one pair of opposed ports, the same being used for both intake and exhaust. This reduction in the number of ports enables a substantial reduction to be effected in the cubic capacity of the explosion chamber with its passages, and reduces the extent to which the rotating valve shell is exposed to the heat of combustion, and reduces the extent to which the valve-lubricating oil is exposed to the flame, provides oversize passages for intake of fuel into the internal valve seat, and gains other advantages.

Another feature of the invention relates to the manner of constructing the detachable engine head, which comprises a base in the form of a box or water-jacket, water-jacketed domes rising from said box and constituting valve seats, exterior valve chests, and manifolds, preferably at each side of the structure. The water-filled base and the water-filled domes or seats are made in one casting; and the manifolds, together with the exterior valve chests, are made in another casting. These castings may then be fastened together and handled as if made in one piece, with the internal domes or seats assembled within the valve chests, and co-operating therewith to form annular wells to receive the respective pairs of differentially revolving valve shells. The outer casting may also be extended up to form a gear box and oil bath. Integral tubular portions may extend up from the valve seats to receive the spark plugs, said tube portions rising from the centers of the valve seats within the hubs of the valve gears and serving as bearings therefor.

Other features and advantages will hereinafter appear.

In the accompanying drawings,

Figure 1 shows diagrammatic plans to illustrate the positions of the valves at the beginnings of the intake, compression, explosion and exhaust strokes.

Figure 2 is a sectional transverse elevation of the engine head, including the valve shells, inner and outer valve chests, manifolds, gears, gear box and spark plug, and the upper part of the engine cylinder.

Figure 6:
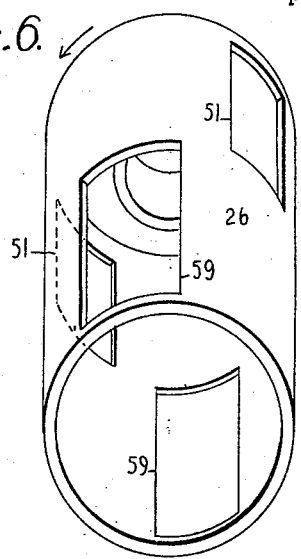
Figure 6 is a diagrammatic perspective of the outer valve shell.
Figure 7:
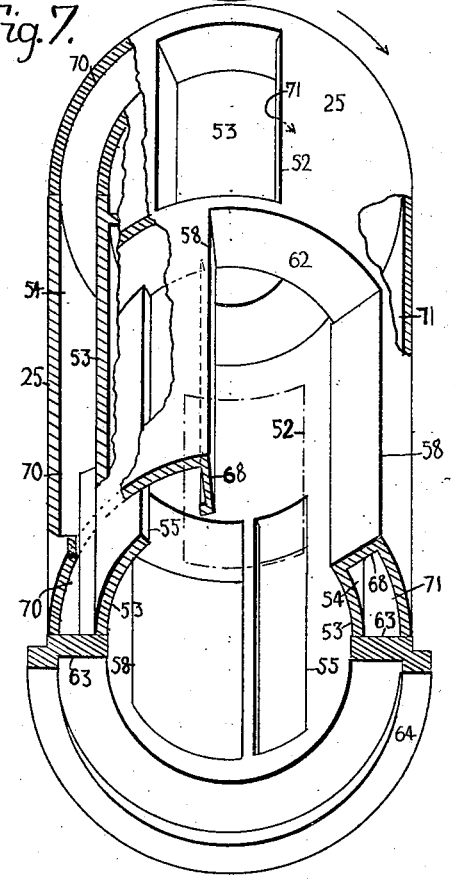

Figure 7 is a diagrammatic perspective of the inner valve shell, with parts broken away. Figure 7 is on a reduced scale as compared with Figure 2, and Figure 6 is drawn on a still smaller scale. It will be understood that the valve shells in any chest revolve oppositely from those in the next chest; and are made accordingly right and left hand; right-hand shells being shown at Figure 2, and left-hand shells at Figures 6 and 7.

Figure 8:
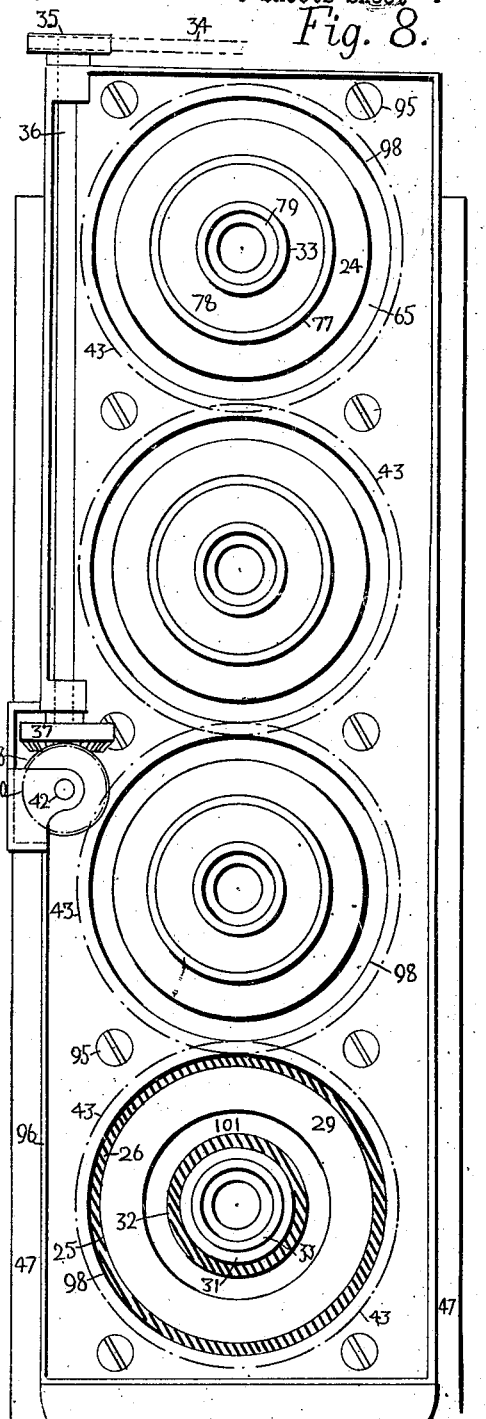

Figure 8 is a plan of the engine head, showing principally the gears, the gear box, and portions of the valves and central valve seat.

Figure 9:
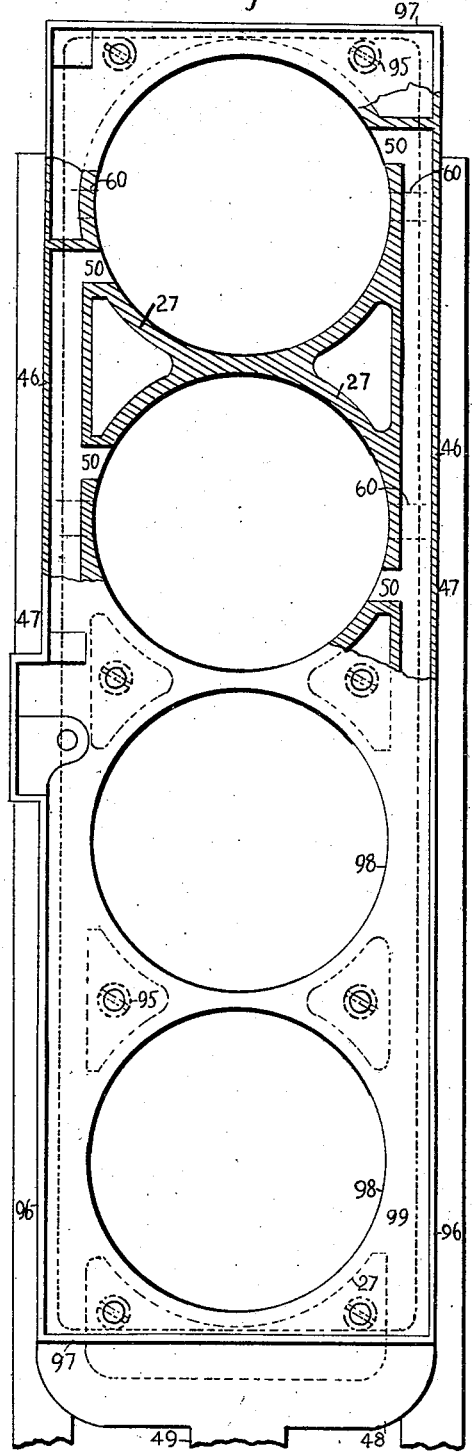

Figure 9 is a part sectional plan of the casting which embodies the valve chests, the gear box and manifolds.

Figure 10:
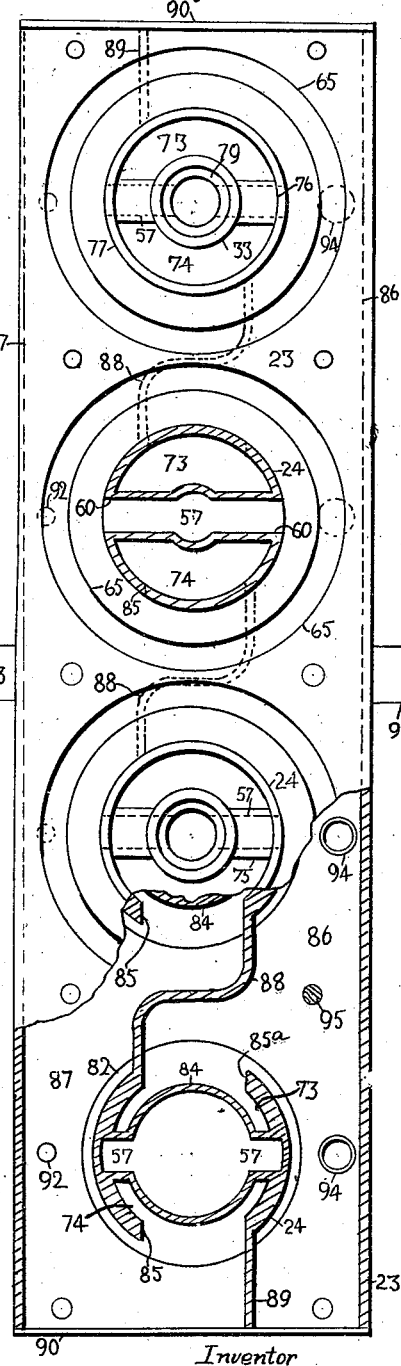

Figure 10 is a part-sectional plan of a casting which comprises the water base of the engine head and the integral water-channeled valve seats rising therefrom.

Four or other number of engine cylinders 20 comprise a conventional block having a jacket 21. Upon said block may be detachably connected, as by bolts 22, an engine head comprising a chambered base or box 23. Preferably cast integral with the engine head is a series of erect cylindrical domes forming ported valve seats 24, chambered for water circulation.

Fitted around each valve seat is a turret-like ported valve shell 25; and fitted upon the latter is a co-operative or complementary ported valve shell 26, preferably rotating oppositely and fitted within a ported cylindrical chest 27. The fitting of the shells to each other and to the chest and the valve seat is close, especially the fitting of the inner shell to the valve seat, so as to seal the engine against leakage. Neither shell by itself constitutes a complete valve, but each co-operates with the other to open and close the fixed ports. The opposite ports of the valve seat may be closed simultaneously, partly by one valve shell and partly by the other, so that the shells are complementary one to the other, and make a single complete rotary valve, which is inserted like a shutter between the seat and chest. The inner valve forms part of a complete shutter which fits between the seat and chest, thus providing automatically expanding and contracting ports for rapidly opening and closing the fixed ports.

The shells fit down in a ported annular well 28, Figure 10, which is formed by co-operation of seat 24 and chest 27. The shells preferably form inverted cups or tubes nested one closely within the other, and may comprise disk-like tops 29 and 30, each integral with its shell, and supporting the shells, and prevent the lower gas-tight edges thereof from wearing away; and they may also aid in preventing leakage, and to connect the shells with bearing hubs 31 and 32 of relatively small diameter. To serve as a bearing for an upwardly-extending inner hub 31 (integral with shell 25), there extends upwardly from seat 24 a boss or tube 33; and the hub 32 of the outer shell may fit upon hub 31.

Figure 3:
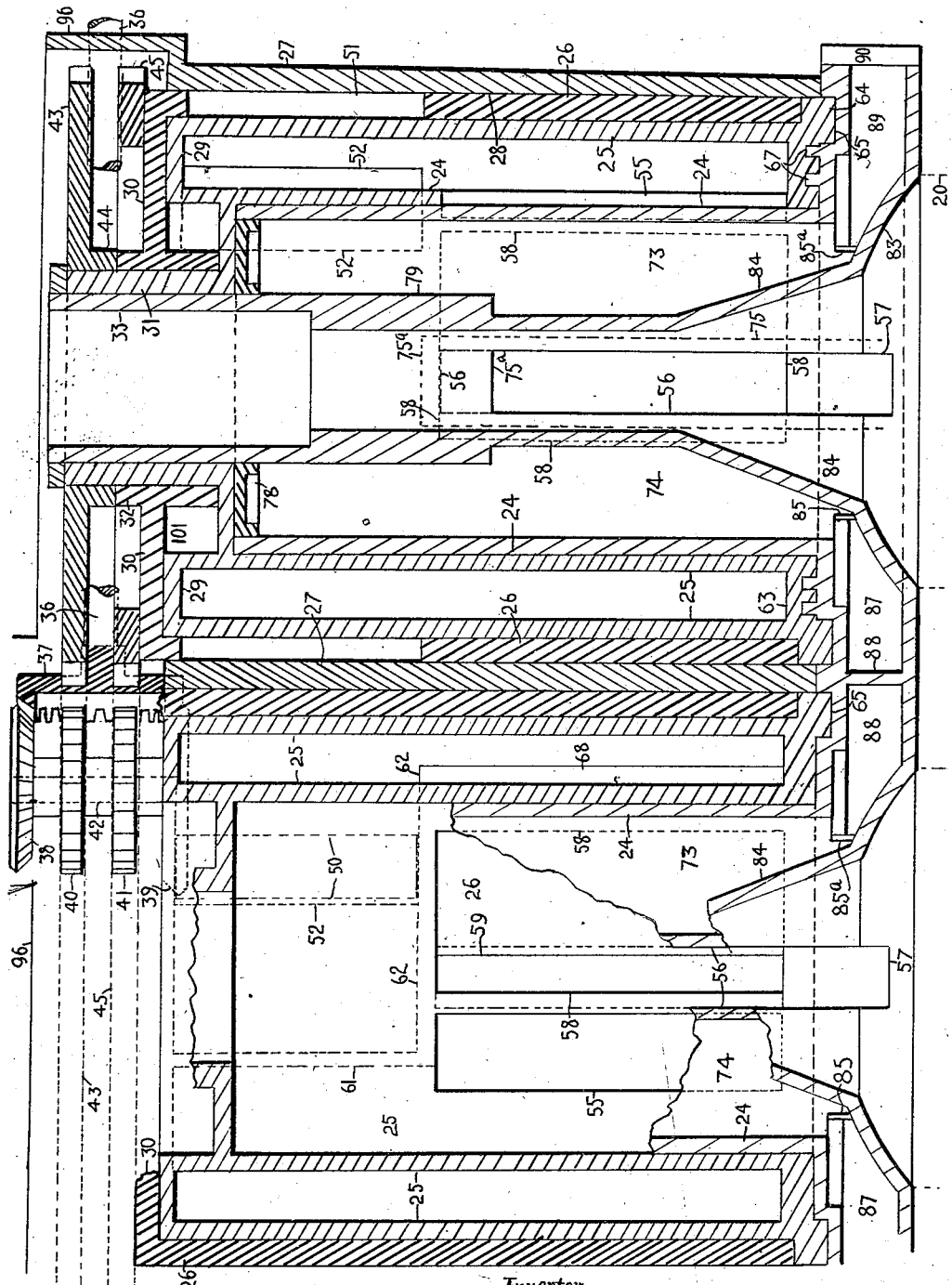
Figure 3 is a vertical central sectional elevation taken longitudinally of valve chests at one end of the row.

Each shell may make one revolution to four revolutions of the crank-shaft of the engine, and for this purpose the shells may be connected up to rotate in opposite directions by means of any suitable gear train. As an illustration, a drive chain 34, Figure 8, running up from the crank-shaft (not shown) runs over a sprocket 35, to revolve a shaft 36 which extends along the top of the engine head, and carries upon its inner end a beveled pinion 37, to mesh with upper beveled gear 38 and concentric lower beveled gear 39, Figure 3. To the upper gear is fixed a pinion 40, which revolves in the opposite direction from pinion 41 fixed to the lower beveled gear 39, these gears and their pinions turning loosely upon a fixed stud 42. The upper pinion 40 meshes with a gear 43, having a hub 44 whereby it is fixed upon the hollow hub 31 of the inner valve shell, to drive the same. The lower pinion 41 meshes with a gear 45 fixed upon the top 30 of the outer valve shell 26, which revolves oppositely from 25. The large driving gears are about in the same planes with their small hubs, thus minimizing friction. The remaining valves are also provided with gears 43, 45, and the gears for one valve set mesh with those for the adjacent valve sets, Figure 8, so that all of the valves are revolved. The valves are made right and left to correspond with their directions of revolution in the respective sets; those shown at Figures 2, 4 and 5 being right, those shown at Figures 6 and 7 being left, and Figure 3 showing both left and right valves. If desired, the inner shells may all be made to revolve in the same direction, and the outer shells all in the opposite direction, by means of other trains of gearing. The shaft 36 and the pinions 40 and 41, may each make one revolution for every crank-shaft revolution.

As seen clearly at Figure 9, the valve chests 27 may be cast in one piece with intake manifolds 46 placed at the sides of the row of chests, and may also be integral with exhaust manifolds 47 beneath and preferably contiguous to the intake manifolds, to heat the latter, but standing away from the valve chests. The intake manifolds may be connected at 48 to a single supply pipe 49. Each chest 27 has upper opposite ports 50 opening from the intake manifolds 46. The chests have alternately right and left hand construction to accord with the operation of the valves. Each outer valve shell 26 has opposite upper intake ports 51, to co-operate with upper intake ports 52 in the exterior wall of the inner valve shell 25, whereby fuel may pass from the intake manifold into the hollow of shell 25. The latter comprises outer cylindrical wall (25) and inner cylindrical wall 53, Figures 4, 5 and 7, these walls being far apart and the shell being partitioned into two segmental gas chambers or conduits 54, (Figure 7) into which open, respectively, said intake ports 52. These gas chambers 54 may extend the entire height of the hollow wall, and may have lower opposite ports 55, both opening into main ports 56 formed in the opposite sides of the internal valve seat 24. A single main diametrical passage 57 extends across or through the valve seat from one port 56 to the other, and may constitute the upper portion of the explosion chamber of the engine. The main ports 56 serve also for exhaust.

Opposite exhaust ports 58, in the lower part of the inner shell and a little in advance of inlet ports 55, extend entirely through the shell, and open through lower ports 59 in the outer valve shell into ports or ducts 60 in the chests, which lead into the opposite exhaust manifolds 47.

The intake ports 55 immediately follow the exhaust ports around the lower portion of the inner shell. When the following edges of the exhaust ports 58 and 59 in the oppositely revolving valve shells approach and finally reach the middle of the main ports 56, thereby co-operatively shutting the same, the leading edges of the intake ports 52 in the inner shell begin to separate from the leading edges of the intake ports 51 in the outer shell, which hence co-operate in the manner of shutters to open the intake ports 50, and at the same time the main ports 56 are opened by the intake ports 55 in the inner shell.

The provision in the central seat of only one main porting for both intake and exhaust ports is of importance as compared with structures in which the seat has both exhaust and intake ports, inasmuch as it permits a great reduction of the area of the valve shell which is exposed to pressure and heat, and latitude is afforded for advantageously making the seat ports oversize. A greater area of valve surface is permitted to contact with the water-cooled central seat; and the hollow valve shell is exposed to the cooling action of the fuel gas throughout its height.

At one side of each of the valve intake ports 52 is a vertical partition 61, which extends from the top 29 of the valve shell down to a midway floor 62 in the form of a segment and forming the top of port 58. It will be noticed that the partitions 61 may divide the upper portion of the valve shell into two semi-circular chambers. Each chamber for a portion of its extent continues downwardly (enclosed between partitions 68) to the bottom floor 63 of the valve shell. Said bottom 63 forms an annulus joining the outer and inner walls 25 and 53 to strengthen the shell, and may be formed with an outer stiffening circumferential flange 64 underlying the outer valve shell 26 and flush therewith; said flange 64 revolving in an annular depression 65 formed in the top of the water base 23 of the engine head. Said bottom 63 preferably has annular grooves 66 into which project fixed rings 67 (which may be integral with water base 23) to prevent gas leakage.

In the lower part of the shell, the chamber end walls 68 form the vertical radial sides of the exhaust ports 58; these walls 68 being substantially downward continuations of the upper walls 61 and joined thereto by jogs 69, said jogs forming portions of the segmental floors 62, and being useful where the intake ports 52 are offset radially with reference to the exhaust ports 58, as illustrated. At one end, therefore, each of the gas chambers is bounded by vertical wall 61, jog 69, and vertical wall 68, and at the other end by vertical wall 61, flooring 62 (including jog 69) and vertical wall 68. The lower gas admission port 55 is placed adjacent the exhaust port 58 in each side of the shell, and at one end of the gas chamber. The gas chambers are designated as 70 and 71.

To balance the pressure upon the inner valve shell 25, which sustains the shock of explosion, the main ports 56 are placed diametrically opposite each other in the seat, thereby avoiding friction between the valve shell and contiguous parts. The shell 25, because of its box-like construction, has great strength to withstand shocks, and, where desired, integral stiffening struts or webs 72 may extend from the inner to the outer wall of the shell, without interfering with the flow of gas. Notwithstanding the great angular extent of the exhaust ports 58, still a considerable area of the internal periphery of the shell 25 remains intact. The walls 58, 61 stiffen the structure, and support it against shocks; further stiffening being secured by the floor and top portions of the valve, which are all cast integral with the walls.

Figure 4:
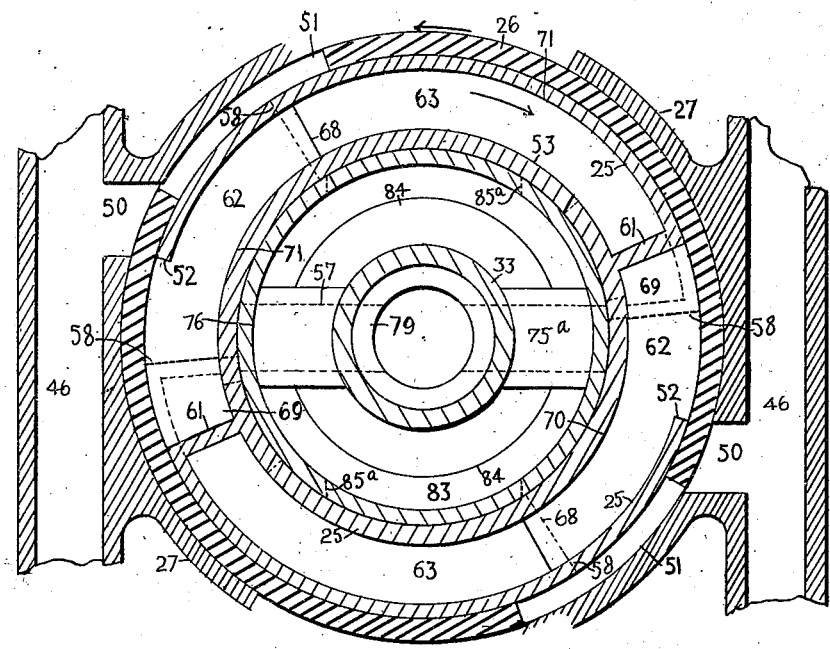
Figures 4 and 5 are transverse sectional plans, Figure 4 being a section through the intake or upper ports of the valve chests and manifolds, and Figure 5 being a section through the lower or exhaust ports and manifolds at the same valve, which is shown at the beginning of the intake stroke of the piston.
Figure 5:
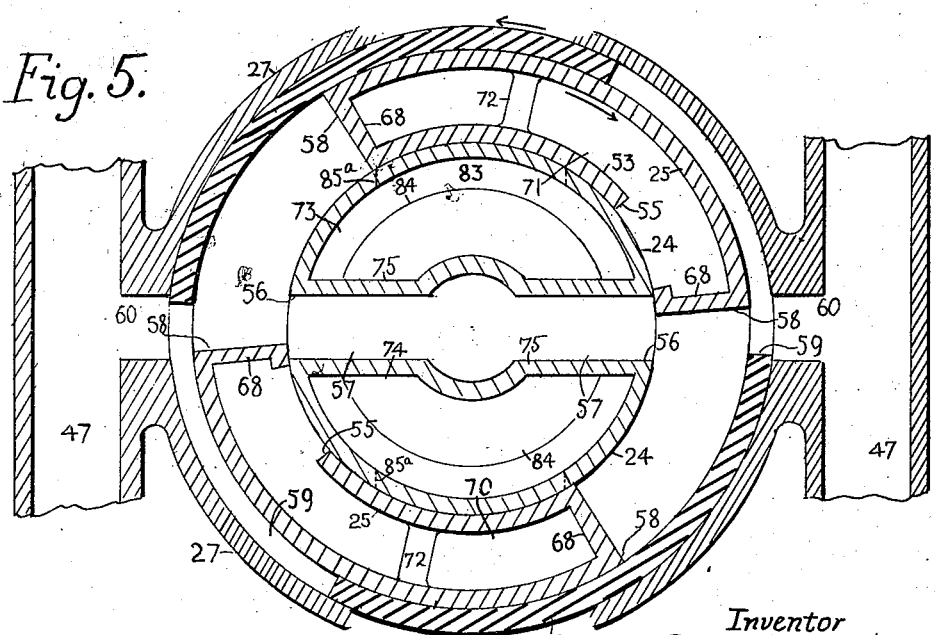

At Figures 4 and 5, and in the left-hand valve at Figure 3, and also in the first diagram at Figure 1, the parts are shown at the beginning of the intake stroke. At this moment the exhaust passages are almost closed by the shutting edges of the inner and outer valve shells 25, 26, at Figure 5, while the intake ports 50 are almost opened by the co-operation of said shells at Figure 4, which shows the upper part of the same construction that is seen at Figure 5. At the start of the intake stroke, the exhausts 60 are completely closed and the intakes 50 opened by said shells; and at the same time opposite gas-admission ports 55 in the inner shell begin to open into the main ports 56 in the internal valve seat. Said intake ports may open into the valve seat a little in advance of the closing of the exhaust passages, and hence some of the residuum of exhaust gas, even though its pressure is very low, may find its way into the chambers 70, 71 of the inner valve shell and there mix with the fuel, tending to heat the same and to favor its subsequent ignition. However if desired, the inlet ports 55 need not open until the exhaust passages 60 are completely closed.

Preferably the timing includes provision for having opening of intake (at port 50) lag 20 degrees of the crank-shaft motion, and for having the closing of the intake lag 46 degrees (although if desired this closing lag may be increased to 60 degrees in some cases); and also for having the exhaust opening lead 55 degrees, and the exhaust closing lag 20 degrees of crank shaft motion.

During nearly the entire intake stroke, the inlet ports 50 in the outer chest remain fully open. These intake passages, however, become nearly closed at the beginning of the compression stroke, as will be understood from the second diagram at Figure 1. From about the beginning through the completion of the intake stroke, the exhaust ports 58 in the inner valve shell are closed. In said compression diagram at Figure 1, the inlet ports 55 in the inner valve shell are nearly closed at the beginning of the compression stroke, it being preferred to permit these intake ports to remain open during the start of the piston at the compression stroke, so as to permit additional gas to flow by momentum into the engine cylinder; these inlet ports 55 closing, however, by the time the crank-shaft has advanced 46° (or even 60°) of the compression stroke. There is so much lap of the inner wall of the valve shell past the main ports 56 in the internal valve seat, by the time the compression stroke is well under way, that appreciable leakage from the engine back into the chambered valve shell is avoided.

At Figure 1 the inner shell 25 is turned to the right, while the outer shell 26 is turned to the left; this figure showing the same structure in four different positions. The beginning of the explosion stroke is indicated in the third diagram at Figure 1, the main ports 56 in the internal valve seat being closed, and there being substantial overlapping of the inner shell around said valve seat at said ports, obviating leakage.

In the last diagram at Figure 1 is illustrated the beginning of the exhaust stroke, the intake ports 55 being still closed, and the exhaust passages being open, the opening of said passages being speeded up by the co-operation of the inner and outer valve shells. The exhaust ports 58 in the inner shell being to open the main ports 56 in the internal valve seat somewhat in advance, so that by the time the outer and inner shells have co-operated at 58 and 59 to form fully-open passages, the inner shell has completely opened the ports 56.

The main ports 56 in the valve seat may be limited in angular extent, inasmuch as they open simultaneously. The speed of opening and closing of 56 is made rapid by the co-operation of the revolving shells, notwithstanding the desirable slow revolution of each shell. For example, the exhaust passage is opened or closed during one-eighth of a revolution of the crank-shaft, and, as illustrated in the last diagram at Figure 1, the exhaust may be wide open at the beginning of the exhaust stroke, and, as will be seen at the first diagram, it is nearly wide open at the beginning of the intake stroke, so that unrestricted outlet is permitted throughout more than an entire stroke of the engine, and the passages 60 may be oversize, as compared with the usual practice, as well as the main ports 56.

The ports 56 in the valve seat are very narrow as compared with the angular extent of the inlet and exhaust ports 55, 58 in the inner valve shell. This narrowness conduces to quick opening and closing of the ports 56, sufficient area of opening whereof is secured by making them relatively high.

The exhaust ports 60 in the valve chest 27 are open to an extent of about 10° of movement of the outer valve shell 26, and the closing of said exhaust ports 60 occurs during about 5° of movement of said outer shell, or 20° of motion of the engine crankshaft; so that both the closing and opening of the exhaust are rapid. The exhaust ports in both valve shells have a relatively great angular extent, to permit the exhaust ports 60 in the valve chest to remain wide open during more than a half of a revolution of the crank-shaft.

By the time that the edges of the exhaust ports 58, 59 in the valve shells meet, the main ports 56 in the valve seat are only half closed; but exhaust of gas is nevertheless stopped; and, as already explained, the intake ports 55 in the inner shell may preferably open into the explosion chamber a little in advance of the final closing of the exhaust ports at 58, 59.

The opening and closing of the intake ports 50 in the chests and manifolds are effected rapidly by the co-operation of the outer and inner valve shells, so that said intake ports 50 are fully opened for a considerable portion of a revolution of the engine crank-shaft.

The opening of the intake ports 50 occurs preferably just after the intake ports 55 open into the explosion chamber at 56, or just after the parts pass the Figure 5 position, and said chest ports 50 are fully opened by about that time that said explosion chamber is fully opened through the intakes 55. The main ports 56 now remain fully open for about 40° of revolution of the crank-shaft; and subsequently, when the ports 56 are more than half closed, the intake is suddenly cut off at the chest ports 50 by the co-operation of the shutting edges of the valve shells. The main ports 56 become completely closed by the time that compression begins, or at least before compression has proceeded very far; and the lapping of the inner valve shell over the edges of ports 56 proceeds during the remainder of the compression stroke and thereafter, thus avoiding leakage.

Each of the internal valve seats 24 may be hollow-walled to provide water spaces 73, 74 in its sides. Each of these water spaces may be exteriorly bounded by the cylindrical body portion of the valve seat. In the lower portion of said valve seat, the water spaces are internally bounded by walls 75, which form the diametrical passage 57 directly connecting the main ports 56.

The water spaces 73, 74 extend the full height of each valve seat, and at its top each water space is in communication with the other above the top 75ᵃ of the valve seat, through an annular water space 76, in an upward extension 77 of the valve seat, which surrounds the central tubular spark plug seat 79 which opens at the bottom into the explosion chamber or gas passage 57, and also forms the base portion of the hollow bearing boss 33. For convenience in casting and manufacture, the annular chamber 76 may be open, but it may be closed by any suitable annular cap 78.

A spark plug 80 is screwed down into the central seat 79 and extends down into the main gas passage 57. The hollow boss 33 is open at the top for the insertion of the plug.

The valve seats rise from the floor plate 81 of the box forming the engine head, that is, from a dome-like portion 82 integral with the floor plate and having at 83 the opening of the gas passage 57 into the engine cylinder. The explosion chamber may comprise a shallow domed portion bounded by 82 and immediately overlying the engine cylinder, and may also comprise gas passage 57, which may be straight walled and narrow and of considerable height; and the same may be conically recessed at 84 to form an upward continuation of the shallow dome. The gas passage 57 is open for the full width of the valve seat and extends down at 83 into the dome portion of the combustion chamber. Room is left for the flow of water through bottom passages 85 into and out of the water spaces 73 and 74. The seat 79 is cooled by the water, and the sparks are formed in the upper part of the passage 57 or explosion chamber where the final portion of the incoming fuel is mixed but little with the residuum of the previously-exploded charge.

Left-hand and right-hand water courses 86, 87 in the boxed engine head are separated from each other by midway partitions 88, each of which, at Figure 10, has an irregular diagonal course from the left-hand edge of the water outlet opening 85 in one seat base to the right-hand edge of the water inlet opening 85ᵃ in the adjacent valve seat base; the partitioning at the ends of the engine head is in the form of short walls 89 which extend each from an opening 85 (at one side thereof) to the extreme end of the engine head. The latter may for convenience be cast fully open at its ends and closed by attached heads 90. It will be seen that all of the water spaces 73 in the valve seats open into the right-hand water course 86, and all of the water spaces 74 open into the left-hand water course 87 by reason of said partitioning, whereby water may pass from 86 in divided streams through inlets 85ᵃ up into water spaces 73 and across through annular spaces 76 into spaces 74 and down the same and through outlets 85 into course 87.

The water is supplied from the usual pump through the usual intake 91, Figure 10, at the bottom of the set of engine cylinders, and flows up around said cylinders. Water which is heated by said cylinders may flow up through relatively small apertures 92 in the floor 81 of the water box of the engine head into the left-hand water course 87, and thence escape through outlet 93, which has a direct connection (not shown) to the usual radiator of the engine. To cool the chambered valve seat and valves, relatively cool water is caused to flow directly into the right-hand water course 86, this water flowing up through supply pipes 94 which extend into the engine jacket 21, or descend from said course 86 alongside of the engine cylinders and terminate a little above the floor of the water-jacketing of the engine cylinders. The cool water in entering the engine water jacket flows along said floor, and much of it enters and passes up through said pipes 94, which may be of considerably greater capacity than the aforesaid perforations 92 of the left-hand water course 87, so that there is free flow of cool water up into the right-hand water course 86. As has been explained, the water thence passes up along one of the spaces in each valve seat and into the overhead annular space, and down the opposite side of the valve seat into the left-hand water course 87 and through said outlet 93, mingling with the heated water that comes up through said perforations 92 from the engine jacketing. Thus the valve seats are cooled and overheating of the valve shells is also prevented.

Thus the valve seat or combustion chamber may be formed with a water jacket arranged interiorly of the valve; that is, the chamber may be double-walled and double-topped, forming the described water spaces, all of which are in open communication with the main water space in the engine head, whereby the cylindrical surfaces of the valve seats are satisfactorily protected from exposure to flame and are kept relatively cool; the difference of temperature and hence the extent of relative expansion of the inner and outer revolving shells, as well as of the valve seats 24 and the valve chests 27, being minimized or reduced, so that liability of binding or friction of the nested complementary valve shells may be rendered negligible.

One of the features of the invention relates to the manner of constructing the engine head. To simplify the manufacture, the engine head is preferably made of two main parts, one part including as a single casting the water base 23 and the water-channeled internal valve seats 24 rising therefrom, Figure 10, and the other part comprising as a single casting the manifolds 46, 47 and the valve chests 27 confined between them, Figure 9. The casting of Figure 9 may be set down upon the base at Figure 10, so that the wells 28 are formed between the internal valve seats and the external valve chests, as at Figure 8, and the two castings are secured together by tie-bolts 95, and machined as if made in one piece. The exterior surfaces of the internal valve seats and the external valve chests may be accurately finished and the inner and outer valve shells may be inserted in said wells 28 and fitted closely thereto. Thus by employing only a small number of relatively simple castings, a single rigid structure may be produced having the required water passages, gas passages and wells. The line of upstanding valve chests 27 extends between these manifolds, which have passages to the opposite sides of the chests. It will be seen that the composite valve may turn in stationary bearings, and may be simple, light and inexpensive, and capable of being readily assembled and disassembled; and the bearings as well as the valve shells themselves may be closely and smoothly fitted and inexpensive. The inlet and exhaust ports may be of relatively large capacity, giving maximum efficiency to the engine, while the length of the crank-shaft need be little if any greater than called for by the dimensions of the engine cylinders, which may be of small diameter and closely packed.

The casting for the valve chests and manifolds, Figure 9, may also include a gear box comprising sides 96 and ends 97, and, as will be seen at Figures 2, 3 and 8, may enclose all of the gears; and the circular openings 98 in the floor 99 of this gear box may be filled by the bodies of the outer valve shells 26, Figure 2. This gear box may be partly filled with oil, which may work down around the outer valve shell 26 to lubricate and seal the same, and may also seep down through perforations 100 in the top of said valve shell into an annular reservoir 101 around the hub 32 of said shell 26, from whence it may flow down through perforations 103 in the top portion of the inner valve shell 25 into one or more oil-feeding recesses 104 cut in the exterior of the internal valve seat 24 to secure lubrication and sealing between said valve seat and the inner valve shell. Oil may also work its way outwardly between the tops of the valve shells, and thence downwardly between the bodies of said shells; and other oil holes in other portions of said shells may be added as desired.

It will be seen that the floor of the gear box may also serve for the top portions of the intake manifolds, and that suitable bearings for the drive shaft may be cast upon the walls of the gear box.

The gear box may be closed by means of a middle cover section 105, Figure 2, which may have a row of perforations 106 over the spark plug chambers, this central cover being permanently secured by screws, while for more convenient access side cover sections 107 may be added, to extend from the central cover to the side edges of the gear box, these being readily movable to give access to the gears and the oil while the central cover remains in place.

Variations may be resorted to within the scope of the invention, and portions of the improvements may be used without others.

Having thus described my invention, I claim:

1. The combination with a ported circular internal valve seat, of a revoluble ported valve shell fitting around the same, said shell having hollow walls, and having inlet ports opening into the space between its walls, to enable the shell to serve as a heating reservoir and conduit for the fuel mixture, and to enable the mixture to cool the shell, said inlet ports being one in the inner side wall and one in the outer side wall, and formed in different regions of the shell, so that space between the walls serves as a lateral passage from one port to the other, said shell also having a perforated port for the exhaust, and a co-operative oppositely-rotated valve shell fitted over said shell and ported to co-operate therewith.

2. The combination with a ported circular internal valve seat, of a revoluble ported valve shell fitting around the same, said shell having hollow walls, said shell having a plurality of intake ports in certain regions of its outer wall and a plurality of intake ports in other regions of its inner wall, and partitions connecting said walls in a manner to provide uncommunicating passages extending along the walls from the outer ports to the inner ports, a ported shell fitted around said shell, and means to revolve said shells in opposite directions at the rate of one revolution for every four revolutions of the engine crank-shaft.

3. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, and means to revolve said shells oppositely and so that a single revolution of the inner shell serves for a plurality of cycles of operation of the engine.

4. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, means to revolve said shells oppositely and so that a single revolution of the inner shell serves for a plurality of cycles of operation of the engine, and a ported chest in which said outer shell fits; said outer shell and said chest having upper inlet ports and lower exhaust ports.

5. An internal combustion detachable engine head for a series of engine cylinders, comprising a row of ported valve chests, ported exhaust manifolds extending along said row, one upon each side thereof, an intake manifold extending along said row, said exhaust and intake manifolds being in different zones, valve structures within said chests, valve seats within said valve structures, one seat for each engine cylinder, each seat having opposite ports, and valve-operating means; said valve structures including hollow-walled revolving shells, each of said shells having opposite exhaust ports therethrough, forming communications between the valve seats and the exhaust manifolds, and having in its inner wall intake ports in the same zone as the exhaust ports and having an inlet in a different zone from the exhaust port, the space between its walls serving as a conduit from said inlet to the inner ports.

6. An internal combustion engine head comprising a row of ported valve chests, exhaust manifolds extending along said row, one upon each side thereof, intake manifolds also extending along said row and one at each side thereof, said exhaust and intake manifolds being in different zones, valve structures within said chests, ported valve seats within said valve structures, valve-operating means; said valve structures including hollow-walled shells, each of said shells having opposite exhaust ports therethrough, and having in its inner wall an intake port in the same zone as the exhaust port and having in its outer wall an inlet port in a different zone from the exhaust port, the space between its walls serving as a conduit from the outer ports to the inner ports, said valve structures also comprising each a shell fitted around the hollow-walled shell and fitting within the chest, and having exhaust and intake ports, and means to effect opposite rotation of the inner and outer shells.

7. The combination with an engine head having a valve seat provided with ports, of complementary ported shells fitted one within the other to form a composite valve fitting around said seat, means for continuously revolving said shells relatively to each other, said engine head having water spaces, and said valve seat having hollow walls in communication with said water spaces, said engine head having a water space within said inner shell and above said valve seat ports and in communication with said hollow walls, and a spark plug inserted down through the top of said valve seat and through its upper water space; said valve seat ported in a single zone, and the inner shell being hollow-walled and having an exhaust perforation in the same zone as said seat, and also having an intake port in its inner wall in said zone, and also having an intake port in its outer wall in a higher zone.

8. The combination with an engine cylinder, of a ported circular internal valve seat constantly open to the cylinder, a revoluble ported valve shell fitting around the seat, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having an inlet in a different zone, the space between the walls of the valve shell serving as a conduit for gas, said valve seat having a single main diametrical passage extending therethrough and opening midway into the engine cylinder and merging into said two seat ports, each of the latter serving for both exhaust and intake, and means for revolving said shell once for every four revolutions of the engine crank-shaft.

9. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports and said valve shell being partitioned to form separate passages from the upper intake ports to the corresponding lower intake ports, said valve seat having a single main diametrical passage extending therethrough and opening into the engine cylinder and merging into said two side ports, each of the latter serving for both exhaust and intake, an outer shell fitted upon said hollow shell and having lower exhaust ports and upper intake ports, and means to revolve said shells oppositely and so that a single revolution of the inner shell serves for two cycles of operation of the engine.

10. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, and means to revolve said shells oppositely and so that a single revolution of the inner shell serves for a plurality of cycles of operation of the engine, the angular extent of the ports in said shells being each several times as great as the angular extent of the ports in said seat.

11. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, and means to revolve said shells oppositely and so that a single revolution of the inner shell serves for two cycles of operation of the engine, the intake ports immediately following the exhaust ports around the lower portion of said inner shell.

12. The combination with an engine cylinder, of a water-jacketed ported circular internal valve seat having a chamber constantly open at one end to said cylinder, and a revoluble ported valve shell fitting around the seat, said shell having hollow walls, said valve seat having opposite pressure-balancing ports, one in each side of the seat, opening into the chamber and engine cylinder, and said valve shell serving as a gas conduit and having opposite exhaust ports extending therethrough and co-ordinated with said seat ports, and also having in its inner wall inlet parts co-ordinated with said seat ports, and having an inlet port in a different zone from said exhaust ports.

13. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, and means to revolve said shells oppositely and so that a single revolution of the inner shell serves for two cycles of operation of the engine; the ports being so placed that at the beginning of the intake stroke the exhaust passages are nearly closed by the co-operative shutting edges of the inner and outer valve shells, while the intake ports are nearly opened by the co-operating ports of said shells, and the construction being such that at the same time the opposite gas-admission ports in the inner shell begin to open into the main ports in the internal valve seat, and that the exhaust ports are about closed at their inner ends at the start of the intake stroke.

14. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, and means to revolve said shells oppositely and so that a single revolution of the inner shell serves for two cycles of operation of the engine; the ports being so placed that at the beginning of the intake stroke the exhaust passages are nearly closed by the co-operative shutting edges of the inner and outer valve shells, while the intake ports are nearly opened by the co-operating ports of said shells, and the construction being such that at the same time the opposite gas-admission ports in the inner shell begin to open into the main ports in the internal valve seat, and that the exhaust ports are about closed at their inner ends at the start of the intake stroke, the intake ports opening into the valve seat a little in advance of the closing of the exhaust passages.

15. The combination with an engine cylinder, of a ported circular internal valve seat having a chamber constantly open to said cylinder, a revoluble ported valve shell fitting around the same, said shell having hollow walls, said valve seat having opposite pressure-balancing ports, one in each side of the seat, to open through said chamber into the engine cylinder, and said valve shell having opposite exhaust ports extending therethrough and co-ordinated with said seat ports, and also having in its inner wall inlet ports co-ordinated with said seat ports, and serving as a conduit for gas, said valve seat being hollow and formed into a channeled water-jacketing surrounding said chamber, a water jacketed seat-supporting base into which said valve seat opens, said base forming a detachable engine head, said valve seat having at one end a water passage from one side to the other, and means separating the seat water-jacketing into channels to direct the flow of water into said seat at one side and out of said seat at the other side.

16. The combination with a ported circular internal valve seat, of a revoluble ported valve shell fitting around the same, said shell having hollow walls, said valve seat having opposite ports, one in each side of the seat, to open into the engine cylinder, and said valve shell having opposite exhaust ports extending therethrough to co-operate with said seat ports, and also having in its inner wall inlet ports for co-operation with said seat ports, and having in its outer wall inlet ports above said exhaust ports, the space between the walls of the valve serving as a conduit for gas between the intake ports, and said valve shell being partitioned to form separate passages from the upper intake ports to the corresponding lower intake ports, an outer shell fitted upon said hollow shell and having lower exhaust ports and upper intake ports, means to revolve said shells oppositely and so that a single revolution of the inner shell serves for a plurality of cycles of operation of the engine, a water-jacketing base into which said valve seat opens at the bottom, said valve seat having in its top a water passage from one side to the other, and means in said base to direct the flow of water into said seat at one side and out of said seat at the other side, said valve seat having tubular portions extending upwardly therefrom and serving as a bearing for the revolving shells, and also serving as a seat for a spark plug, and said water passage in the upper portions of said valve seat being annular, the top of said annular passage being open, and an annular cap to close the same.

17. A detachable engine head comprising a base in the form of a water-jacket, circular water-jacketed valve seats rising from said base and forming one casting therewith, a series of valve chests surrounding the valve seats and co-operating therewith to form wells for revolving valve shells, intake and exhaust manifolds integral with said valve chests, means for securing together said base and said valve-chest structure, and midway partitions connecting said valve seats at their lower portions and dividing said base into separate water courses, each of which communicates with the other in divided streams through the several valve seats.

18. The combination with a water-jacketed engine cylinder, of a detachable engine head comprising a base in the form of a water-jacket, circular water-jacketed valve seats rising from said base and forming one casting therewith, said water base having openings through its floor into the water-jacket of the engine cylinder at one side thereof, and having openings in said floor at the other side thereof, ducts extending from said large openings down within the water-jacket of the engine to the lower portion thereof, and means compelling water rising through said ducts to flow from one side of said base through said valve seats to the other side thereof.

19. The combination with a circular valve seat having communicating ports, said ports formed in one zone, of complementary ported shells fitted one within the other to form a composite valve fitting around said valve seat, and means for continuously revolving said shells in opposite directions, said composite valve ported to cause two complete cycles of operations during each complete revolution of the valve, each shell being connected to make one revolution for each four revolutions of the engine-crank-shaft; the inner shell having exhaust perforations in the same zone with said seat ports, and also having intake ports in the same zone on its inner face, and an inlet out of said zone and communicating along the shell wall with the intake ports.

20. The combination with a circular valve seat, of complementary ported shells fitted one within the other to form a composite valve fitting around said valve seat, and means for continuously revolving said shells in opposite directions, said composite valve ported to perform two complete cycles of operations during each complete revolution of the valve, each shell being connected to make one revolution for each four revolutions of the engine-crank-shaft, the valve seat having diametrically opposite ports in one zone, said inner shell being of hollow-walled construction and having exhaust ports in the same zone to co-operate with the ports in said seat, and also having in its inner wall intake ports immediately following the exhaust ports, and in the same zone, to cooperate with the same ports in said seat, and said inner shell also having an inlet in a different zone.

21. The combination with a circular valve seat, of complementary ported shells fitted one within the other to form a composite valve fitting around said valve seat, means for continuously revolving said shells in opposite directions, said composite valve ported to form two complete cycles of operations during each complete revolution of the valve, each shell being connected to make one revolution for each four revolutions of the engine-crank-shaft, the valve seat having diametrically opposite ports in a single zone, and the inner shell having both exhaust ports and intake ports in the same zone as said seat ports, and also having exterior intake ports in a different zone, and a chest having only exhaust ports in the first zone, and only intake ports in the second zone.

22. The combination with a valve seat having communicating ports all in one zone, of complementary ported shells fitted one within the other to form a composite valve fitting around said valve seat, means for continuously revolving said shells in opposite directions, said composite valve ported to form a repetition of cycles of operations during each complete revolution of the valve and connected to be revolved at a correspondingly reduced rate, relatively to the rate of revolution of the engine-crank-shaft, the inner shell having in its inner surface intake ports and also having exhaust perforations in the same zone as said intake ports, said inner shell also having in its outer surface intake ports in a different zone from said inner ports but respectively in communication therewith, and a chest within which said composite valve is fitted, said chest having in one zone intake ports and in another zone exhaust ports, and communicating on each side with both exhaust and intake manifolds.

23. The combination with a circular valve seat multiple ported in only one zone, of complementary ported shells fitted one within the other to form a composite valve fitting around said valve seat, and means for continuously revolving said shells in opposite directions, said composite valve ported in two zones to form two complete cycles of operations during each complete revolution of the valve, each shell being connected to make one revolution for each four revolutions of the engine-crank-shaft, said composite valve during one-half of its revolution operating for intake, compression, explosion and exhaust, and during the second half of its revolution repeating said cycle of operations; the inner of said shells being hollow and having on its inner side exhaust and intake ports in the same zone as the seat ports, and having on its outer side an exhaust port in the same zone and an intake port in a different zone.

24. A detachable engine head comprising a base in the form of a water-jacket, and circular water-jacketed valve seats rising from said base and forming one casting therewith, said engine head having water spaces, and each valve seat having hollow walls forming separate channels in communication with said water spaces, and also having a water passage above said valve seat and forming a communication between said channels.

25. The combination with a valve seat having ports, of complementary ported shells fitted one within the other to form a composite valve fitting around said valve seat, and means for oppositely revolving said shells, said composite valve ported to form successive complete cycles of operations during each complete revolution of the valve, the seat ported in only one zone, the inner shell exhaust ported in the same zone, and having an inner intake port in the same zone and an outer intake port in a different zone, the outer shell being exhaust ported in the first zone and intake ported in the second zone.

26. The combination of an engine head having a row of hollow-walled ported explosion chambers or valve seats, each valve seat having intake and exhaust ports, complementary ported shells fitted one within the other to form a valve fitted upon each valve seat, and means to revolve the shells oppositely, said engine head partitioned to form a water course at each side thereof, said water courses in open communication with the hollow walls of said valve seats, said hollow walls forming water spaces in communication with each other above said ported valve seats, the inner valve shell extending up to surround the water space above said ported valve seat.

27. The combination with an engine cylinder, of a ported circular internal valve seat having an interior chamber constantly open to the engine cylinder, and a revoluble ported valve barrel fitting around the same, said valve barrel having hollow walls, opposite exhaust ports being provided in said seat and said valve barrel, the valve barrel being ported for fuel inlet only in its inner wall and in the same zone with said exhaust ports, and means for revolving said valve barrel.

28. The combination with an engine cylinder, of a ported circular internal valve seat having an interior chamber constantly open to the engine cylinder, a revoluble ported valve barrel fitting around the same, said valve barrel having hollow walls, opposite exhaust ports being provided in said seat and said valve barrel, the valve barrel being ported for fuel inlet only in its inner wall and in the same zone with said exhaust ports, means for revolving said valve barrel, and a valve chest within which said valve rotates, said chest having exhaust ports and being co-ordinated with said seat and valve barrel.

29. The combination with a row of engine cylinders, of a row of ported circular internal valve seats individual to said cylinders and each having an interior chamber constantly open to the engine cylinder, and a revoluble ported valve shell fitting around the same, said shell having hollow walls, and controlling admission of fuel between its said walls and through said chamber to the associated engine cylinder and also controlling exhaust from said cylinder through said chamber, said shell having in its sides inlet ports opening into the space between its walls, to enable the shell to serve as a heating reservoir and conduit for the fuel mixture, and to enable the mixture to cool both the shell and said chamber, and means for operating said valves.

BURNHAM C. STICKNEY.